United States Patent
Bauer et al.

(10) Patent No.: US 10,877,446 B2
(45) Date of Patent: Dec. 29, 2020

(54) SWITCHING BETWEEN WORKPIECE PROCESSING OPERATING MODES OF A PROCESSING MACHINE

(71) Applicant: TRUMPF Werkzeugmaschinen GmbH + Co. KG, Ditzingen (DE)

(72) Inventors: Klaus Bauer, Ditzingen (DE); Uwe Huber, Ingersheim (DE); Eberhard Wahl, Weilheim (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 894 days.

(21) Appl. No.: 14/294,379

(22) Filed: Jun. 3, 2014

(65) Prior Publication Data

US 2014/0343712 A1     Nov. 20, 2014

Related U.S. Application Data

(63) Continuation of application No. PCT/EP2012/005021, filed on Dec. 6, 2012.

(30) Foreign Application Priority Data

Dec. 12, 2011 (DE) ........................ 10 2011 088 220

(51) Int. Cl.
*G05B 15/02* (2006.01)
*G05B 19/409* (2006.01)

(52) U.S. Cl.
CPC ............ *G05B 15/02* (2013.01); *G05B 19/409* (2013.01); *G05B 2219/33302* (2013.01)

(58) Field of Classification Search
CPC ...................................................... G05B 15/02
See application file for complete search history.

(56) References Cited

U.S. PATENT DOCUMENTS 8,595,827 B2 * 11/2013 Zondler .................. G05B 9/02
                                                                      700/20
2010/0138031 A1    6/2010 Werfeli et al.

FOREIGN PATENT DOCUMENTS

DE      102008060010 A1    6/2010
EP           1580629 A1    9/2005
(Continued)

OTHER PUBLICATIONS

International Search Report from corresponding PCT Application No. PCT/EP2012/005021, dated Apr. 3, 2013, 4 pages.

*Primary Examiner* — Tejal Gami
(74) *Attorney, Agent, or Firm* — Fish & Richardson P.C.

(57) ABSTRACT

Methods, systems, and apparatus, including computer programs encoded on computer storage media, for switching between different operating modes on a processing machine. The operating modes are different from one another in respect of operator intervention requirements of an operator of the processing machine, One of the methods includes switching from a first operating mode to a second operating mode, looking up stored operating settings specific to the second operating mode and related to one or more potential operator interventions, changing operation of the processing machine in accordance of the stored operating settings specific to the second operating mode, and providing feedback to the operator of the machine, indicating whether a switch to the second operating mode is complete or whether at least one of the potential operator interventions is required.

18 Claims, 1 Drawing Sheet

(56) References Cited

FOREIGN PATENT DOCUMENTS

| | | |
|---|---|---|
| EP | 2034378 A2 | 3/2009 |
| EP | 2187281 A1 | 5/2010 |
| EP | 2354870 A2 | 8/2011 |
| JP | 6206150 | 7/1994 |

* cited by examiner

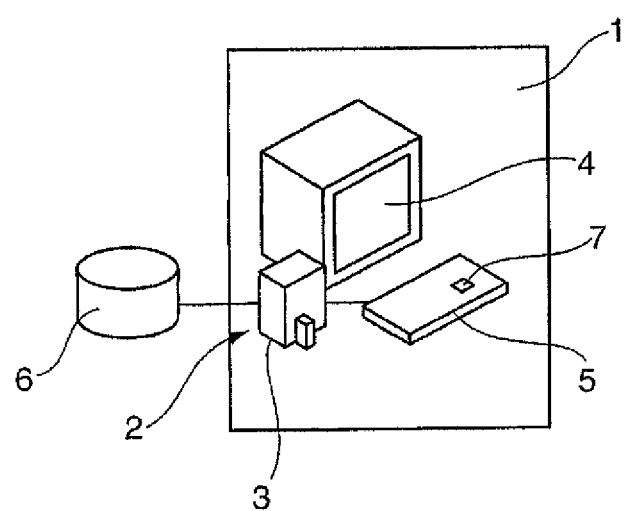

SWITCHING BETWEEN WORKPIECE PROCESSING OPERATING MODES OF A PROCESSING MACHINE

CROSS REFERENCE TO RELATED APPLICATION

This application is a continuation of and claims priority under 35 U.S.C. § 120 to PCT Application No. PCT/EP2012/005021 filed on Jun. 12, 2012, which claimed priority under 35 U.S.C. § 119 to German Application No. DE 10 2011 088 220.0 filed on Dec. 12, 2011. The content of these priority applications are hereby incorporated by reference in their entirety.

TECHNICAL FIELD

The present invention relates to switching between different workpiece processing operating modes of a processing machine which differ from one another in respect of operator intervention requirements of a machine operator.

BACKGROUND

Machine tools are typically used with an operator in attendance. However, temporary non-operator-attended operation ("unmanned operation") is increasingly also taking place. To that end, the machine is optimised technically by various characteristics for such operation (e.g., set-up reduction such as nozzle exchangers or single-head strategy or re-sorting of the production scheme for optimal set up). However, when changing from operator-attended workpiece processing operation to non-operator-attended workpiece processing operation, optimum settings/operating modes exist which are in some cases conflicting. This has the result that the machine does not work optimally when there are frequent changes, but additional adjustment work is required. The high outlay for optimum change leads to reduced flexibility in use ("the machine operator cannot go away for even a short time") or to suboptimal settings ("the machine operator nevertheless simply goes away for a short time and leaves the machine to carry on running as it is").

SUMMARY

One aspect of the invention features a method including switching from a first operating mode to a second operating mode, looking up stored operating settings specific to the second operating mode and related to one or more potential operator interventions, changing operation of the processing machine in accordance of the stored operating settings specific to the second operating mode, and providing feedback to an operator of the machine, indicating whether a switch to the second operating mode is complete or whether at least one of the potential operator interventions is required.

The method can improve switching between different workpiece processing operating modes of a processing machine in such a manner that optimum operation of the processing machine can be ensured in each workpiece processing operating mode.

Switching preferably takes place between an operator-attended first workpiece processing operating mode and a non-operator-attended second workpiece processing operating mode ("unmanned operation").

In some implementations, individual elements (e.g. seat or gear) are not combined into a configuration set in response to component-related specifics, but the machine operator is able for the first time to define specific processing parameters or strategies for each operating mode and make them switchable in a simple manner; that is to say, they are operating modes for workpiece processing, in short: workpiece processing operating modes. The operating strategies thereby affect the system as a whole. The operating settings (parameters) of the individual machine components that are required for a particular processing strategy are defined beforehand and stored in tables, for example. On switching to a new workpiece processing operating mode, the machine components are adjusted or reconfigured to the previously stored operating strategy without operator intervention. For changing the operating strategies, corresponding actuator/sensor systems as well as communication interfaces are provided on the machine, and these make the desired adjustments.

The processing strategies can include, for example:
material handling,
maintenance and cleaning cycles,
calibration cycles,
threshold values for condition monitoring,
reactions in the event of alarm limits being exceeded (warnings, fault messages),
automatic restarting in fault situations ("retry"),
automatic adjustment of the order sequence in the production scheme,
process implementation (specific influencing of process safety),
communication of the machine when problems are detected,
immediate feasibility check when changing to the new operating mode.

In some cases, feedback is given to the machine operator as to whether the switch has been successfully completed or whether operator intervention is still required in order to finalise the switch. In the case of the non-operator-attended workpiece processing operating mode, the machine operator in particular receives an indication of how long or until when the machine can operate unmanned and why an operator intervention will then be necessary. In particular after changing to the non-operator-attended workpiece processing operating mode, a message can also be given to the machine operator in respect of the early operator intervention which will enable operation of the processing machine in the non-operator-attended workpiece processing operating mode to be extended.

Switching can take place between a workpiece processing operating mode with an operator (e.g. day shift) and a workpiece processing operating mode without an operator (e.g. night shift). However, further workpiece processing operating modes are also conceivable, such as, for example,
weekend shift,
short-term unmanned operation, for example because of fault repair on another machine,
simple operation for untrained operators. In this case, the machine would carry out, for example, those single measures which bring about increased process safety and apply fault correction mechanisms (miscuts, collisions) automatically so that the machine operator only has to carry out simple maintenance work, loading and unloading. A "check into the future" can then show when complex maintenance work will be necessary, that is to say the length of time for which the untrained operator can be expected to work on the machine without further assistance from a trained operator.

The previously stored operating settings and/or parameters of the different workpiece processing operating modes can differ from one another in respect of operating sequence and/or process safety and/or quality of the processing result and/or processing speed and/or degree of automation. A workpiece processing operating mode with a low operator intervention requirement, for example, will have a higher process safety and/or a lower processing speed and/or a higher degree of automation than a workpiece processing operating mode with a higher operator intervention requirement.

In the case of the non-operator-attended workpiece processing operating mode, user interactions which are expedient in an attended workpiece processing operating mode can also be checked automatically, looking into the future, at the time of the switch, and then alternative solutions which are possible without the machine operator can be activated for all interactions which can be circumvented. If conditions that require an operator intervention nevertheless arise, then an appropriate form of communication is automatically chosen therefor.

Switching between two different workpiece processing operating modes can take place either manually by the machine operator, for example by actuation of a corresponding button on the processing machine, or in a time-controlled manner or by remote access. In the latter case, it is also preferable to store beforehand for each workpiece processing operating mode details in respect of whether and what information about the machine operation is transmitted by remote access.

Another aspect of the invention features a processing machine suitable for carrying out the method according to the invention, having a memory configured to store respective operating settings relating to potential operator interventions for different operating modes of the workpiece processing machine, the operating modes being different from one another in respect of the operator intervention requirements of an operator of the workpiece processing machine; a control system configured to change an operation of the processing machine in accordance with operating settings stored in the memory, in response to switching from a first operating mode of the processing machine to a second operating mode of the processing machine; and an operator feedback device operable by the control system to provide an indication to an operator of the machine as to whether switching from the first operating mode to the second operating mode is complete or whether at least one of the potential operator interventions is required to complete the switching.

The processing machine preferably has a switch, in particular a key or button in the operator interface, for switching to a second workpiece processing operating mode, in order by single-button control to reconfigure the machine operation to the second workpiece processing operating mode and carry out the check in respect of the next operator intervention.

In a further aspect, the invention relates also to a computer program product which has code means which are adapted for carrying out all the steps of the method according to the invention when the program is run on a data processing system.

Further advantages of the invention will become apparent from the claims, the description and the drawing. The features mentioned above and those listed below can likewise be used individually or a plurality can be used in arbitrary combinations. The embodiments shown and described are not to be understood as being an exhaustive list; on the contrary, they are of an exemplary nature for illustrating the invention.

DESCRIPTION OF DRAWING

FIG. 1 shows a processing machine 1, in the form of machine tool. This machine tool 1 can be, for example, a machine for 2D laser cutting, for laser tube cutting, for punching, for punch laser processing or for bending workpieces.

DETAILED DESCRIPTION

The machine tool 1 is controlled in each case by means of a numeric machine control system 2 which comprises as hardware an HMI (human machine interface) operating system with a control computer 3 in the form of an industrial PC and an operating device with a screen as the machine display (machine operator interface) 4 and an input unit (keyboard, mouse or touch panel) 5. Instead of running on an industrial PC, the machine control system can also be run distributed on other control systems.

The machine tool 1 can be operated in different operating modes which differ from one another in respect of the operator intervention requirements of a machine operator. For each operating mode of the processing machine 1, operating settings and/or parameters that are specific for operator interventions which can be required of the machine operator are stored beforehand in a data memory 6. These stored operating settings and/or parameters of the different operating modes can differ from one another in respect of processing sequence and/or process safety and/or quality of the processing result and/or processing speed and/or degree of automation; they are accordingly operating modes for workpiece processing, in short: workpiece processing operating modes. Thus, for example, a workpiece processing operating mode with a low operator intervention requirement has a higher process safety, a lower processing speed and a higher degree of automation than a workpiece processing operating mode with a higher operator intervention requirement.

The switch from an operator-attended first workpiece processing operating mode to a non-operator-attended second workpiece processing operating mode ("unmanned operation") will be described in the following.

By pressing a button 7 on the input unit 4, the machine operator switches the machine tool 1 into the non-operator-attended workpiece processing operating mode. More precisely, pressing the button 7 has the effect that the machine control system 2 changes the operation of the processing machine 1 in accordance with the previously stored operating settings and/or parameters of the non-operator-attended workpiece processing operating mode.

In the non-operator-attended workpiece processing operating mode, the operating settings or operating parameters of the machine components are chosen with the following aim:
- increased process safety, for example by more frequent self-calibration, slow&safe machine operation, etc.,
- systematic use of automation, as a result of which the number of operator interventions required is reduced or delayed (e.g. by automatic cutting head and nozzle exchange, more frequent recalibrations for the automatic elimination of faults, more frequent cleaning, etc., use of reserves of operating supplies),
- use of processing strategies which can ensure prolonged unmanned operation (setting of microjoints and skeleton-free processing to increase process safety and reduce or delay necessary manual interventions).

The machine control system 2 gives feedback to the machine operator, via the machine display 4, in respect of whether the switch to the non-operator-attended workpiece processing operating mode has been successfully completed or whether operator interventions are still required in order to finalise the switch. In addition, when switching to the non-operator-attended workpiece processing operating mode, the machine control system 2 also performs a "check into the future" in order to anticipate faults which can already be foreseen and ensure that the machine tool 1 is ideally prepared for the unmanned phase.

This "check into the future" can include, for example:

checking the production scheme for implementability (all the machine components, such as, for example, tools, and material required therefor are available and exchangeable; sufficient processing tasks for an expediently lengthy unmanned phase are present);

checking of upcoming maintenance tasks in the unmanned phase;

checking that the level of operating supplies is sufficient. If required, the operator is required to check this.

monitoring of the conditions of machine components and recommendation of preventative replacement.

After successful switching to the non-operator-attended workpiece processing operating mode, the machine control system 2 also indicates to the machine operator, via the machine display 4, the early operator intervention which will enable operation of the machine tool 1 in the non-operator-attended workpiece processing operating mode to be extended.

The following table shows different operating settings in the operator-attended normal operating mode and in the non-operator-attended unmanned operating mode of a laser cutting machine for cutting workpieces from a sheet.

TABLE

| Single measure | Normal operation | Unmanned operation |
|---|---|---|
| Calibration distance sensor system | longer interval y | shorter interval x |
| Check of nozzle centring | longer interval y | shorter interval x |
| Nozzle cleaning | longer interval y | shorter interval x |
| Slow&safe operation (e.g. lower speed, power) | no | yes |
| Skip part (e.g. in the case of cutting fault, piercing fault) | no | yes |
| Skip sheet (e.g. if correct tools not fitted, correct sheet not in storage connection) | no | yes |
| Number retry part (retry cutting) | 1 | 3 |
| Number retry sheet | 1 | 1 |
| Nozzle change (same nozzle, e.g. in the case of several skip part faults, max. cutting time of a nozzle) | no | yes |
| Cutting head change (for cutting head of same type) | no | yes |
| Automatic despatch of information by SMS, fax or email in the event of a fault | no | yes |
| Behaviour when operating supplies empty | stop | tolerance specification |
| Status indicator support | no | yes |
| Behaviour on initiation lens monitoring | stop | e.g. automatic cutting-head change with new lens |
| Automatic loading active | yes | yes |

TABLE-continued

| Single measure | Normal operation | Unmanned operation |
|---|---|---|
| Automatic unloading sheet active | no | yes |
| Automatic unloading skeleton | yes | yes |
| Unloading position | 2 (manual) | 1 (automatic) |
| Return to storage (→ ensure sufficient capacity for usable parts for one night's/weekend's production | no | yes |
| SortMaster (=system with group of unloading containers, for sorting discharged parts) active | yes | yes |
| Skeleton cutting | Normal size of skeleton pieces | Cutting into smaller skeleton pieces → more reliable disposal with more time outlay |
| Formation of microjoints (no risk of parts tipping; sheet which must otherwise be discharged manually can be removed completely by automation after processing) | no | yes |

What is claimed is:

1. A method of switching between different workpiece processing operating modes on a processing machine, the operating modes being different from one another in respect of operator intervention requirements of an operator of the processing machine, the method comprising:

for each of the operating modes, storing respective operation settings that are specific for potential operator interventions requested by the machine operator;

switching from an operator-attended first workpiece processing operating mode (a first operating mode) to a non-operator-attended second workpiece processing operating mode (a second operating mode);

changing, by a machine control system, operation of the processing machine in at least one of a processing sequence, a process safety, quality of a processing result, a processing speed, and a degree of automation in accordance of the stored operating settings specific to the second operating mode;

providing feedback from the machine control system to the operator of the processing machine, indicating whether a switch to the second operating mode is complete or whether at least one of the potential operator interventions is required;

determining, by the machine control system, that the switch to the second operating mode is complete;

anticipating, by the machine control system, a future second operating mode fault condition in the processing machine; and in response to anticipating a future second operating mode fault condition, providing, by the machine control system, an indication to the operator, indicating an early operator intervention to be performed to enable an extension of operation of the processing machine in the second operating mode.

2. The method of claim 1, further comprising:

determining respective operating settings relating to the potential operator interventions for the different operating modes of the processing machine; and storing the determined operating settings for the different operating modes.

3. The method of claim 2, wherein the determined operating settings for the different operating modes differ from each other in respect of at least one of a processing sequence, a process safety, quality of a processing result, a processing speed, or a degree of automation.

4. The method of claim 2, wherein determining respective operating settings comprises determining at least one of a higher process safety, a lower processing speed, or a higher degree of automation for an operating mode with a lower operator intervention requirement than an operating mode with a higher operator intervention requirement.

5. The method of claim 1, wherein the processing machine includes at least one of a machine for laser cutting, a machine for laser tube cutting, a machine for punching, a machine for punch laser processing, or a machine for bending workpieces.

6. The method of claim 1, further comprising:
determining whether a next operator intervention is required;
in response to determining that the next operator intervention is required, determining when the next operator intervention is required; and
in response to determining that the next operator intervention is required at a specific time point, notifying the operator that the next operator intervention is required at the specific time point.

7. The method of claim 1, further comprising receiving an operation from the operator to initiate the switch from the first operating mode to the second operating mode.

8. The method of claim 1, wherein switching from a first operating mode to a second operating mode comprises switching from the first operating mode to the second operating mode in a time-controlled manner or by remote access.

9. The method of claim 1, wherein the stored operating settings specific to the second operation mode include details in respect of whether and what information about the second operation mode is transferred by remote access.

10. A workpiece processing machine comprising:
a memory configured to store respective operating settings relating to potential operator interventions for different workpiece processing operating modes of the workpiece processing machine, the operating modes being different from one another in respect of the operator intervention requirements of an operator of the workpiece processing machine;
a control system configured to change an operation of the processing machine in at least one of a processing sequence, a process safety, quality of a processing result, a processing speed, and a degree of automation in accordance with operating settings stored in the memory, in response to switching from an operator-attended first operating mode (a first operating mode) of the processing machine to a non-operator-attended second operating mode (a second operating mode) of the processing machine; and
an operator feedback device operable by the control system
to provide a feedback to an operator of the machine as to whether switching from the first operating mode to the second operating mode is complete, and
to provide an indication to the operator, indicating whether an early operator interventions is required to extend operation of the processing machine in the second operating mode, wherein the indication is being provided in response to anticipating a future second operating mode fault condition.

11. The workpiece processing machine of claim 10, wherein the processing machine includes at least one of a machine for laser cutting, a machine for laser tube cutting, a machine for punching, a machine for punch laser processing, or a machine for bending workpieces.

12. The workpiece processing machine of claim 10, wherein the operating settings for the different operating modes differ from each other in respect of at least one of a processing sequence, a process safety, quality of a processing result, a processing speed, or a degree of automation.

13. The workpiece processing machine of claim 10, wherein the control system is configured to:
determine that switching from the first operating mode to the second operating mode is complete;
determine whether a next operator intervention is required;
in response to determining that the next operator intervention is required, determine when the next operator intervention is required at a specific time point; and
in response to determining that the next operator intervention is required at a specific time point, notify the operator that the next operator intervention is required at the specific time point.

14. The workpiece processing machine of claim 10, wherein the control system is configured to switch from the first operating mode to the second operating mode in a time-controlled manner or by remote access.

15. The workpiece processing machine of claim 10, wherein the second operating condition includes details in respect of whether and what information about the second operation mode is transmitted by remote access.

16. A non-transitory computer readable storage medium storing instructions executable by a data processing apparatus and configured to, upon such execution, cause a workpiece processing machine to:
switch from a first operating mode to a second operating mode;
look up stored operating settings specific to the second operating mode and related to one or more potential operator interventions;
change operation of the processing machine in at least one of a processing sequence, a process safety, quality of a processing result, a processing speed, and a degree of automation in accordance of the stored operating settings specific to the second operating mode;
provide feedback to an operator of the machine, indicating whether a switch to the second operating mode is complete;
anticipating a future second operating mode fault condition; and
in response to anticipating a future second operating mode fault condition, providing an indication to the operator, indicating whether an early operator interventions is required to extend operation of the processing machine in the second operating mode.

17. The method of claim 1, wherein the indication indicates the anticipated future second operating mode fault condition.

18. The method of claim 1, wherein switching from the first operating mode to the second operating mode occurs in response to manually actuating a switch of the machine control system.

* * * * *